(12) United States Patent
El Khoury et al.

(10) Patent No.: US 10,055,558 B2
(45) Date of Patent: Aug. 21, 2018

(54) TELECOMMUNICATION METHOD FOR AUTHENTICATING A USER

(71) Applicant: SAP SE, Walldorf (DE)

(72) Inventors: Paul El Khoury, Heidelberg (DE); Robert Lorch, Bad Schoenborn (DE)

(73) Assignee: SAP SE, Walldorf (DE)

(*) Notice: Subject to any disclaimer, the term of this patent is extended or adjusted under 35 U.S.C. 154(b) by 203 days.

(21) Appl. No.: 15/016,574

(22) Filed: Feb. 5, 2016

(65) Prior Publication Data

US 2016/0239648 A1 Aug. 18, 2016

(30) Foreign Application Priority Data

Feb. 12, 2015 (DE) .................. 10 2015 202 485

(51) Int. Cl.
*G06F 21/31* (2013.01)
*H04L 29/06* (2006.01)
*H04W 12/06* (2009.01)

(52) U.S. Cl.
CPC .......... *G06F 21/31* (2013.01); *H04L 63/0853* (2013.01); *H04W 12/06* (2013.01)

(58) Field of Classification Search
CPC ..... G06F 21/31; H04L 63/10; H04L 63/0853; H04W 12/06
See application file for complete search history.

(56) References Cited

U.S. PATENT DOCUMENTS 8,355,696 B1 * 1/2013 Olding ............... H04M 1/72525
  455/406
8,478,195 B1 * 7/2013 Hewinson ............ H04B 5/0031
  235/379

(Continued)

FOREIGN PATENT DOCUMENTS

WO   WO 2004/070591   8/2004

*Primary Examiner* — Harunur Rashid
*Assistant Examiner* — Sher A Khan
(74) *Attorney, Agent, or Firm* — Harness, Dickey & Pierce, P.L.C.

(57) ABSTRACT

The disclosure relates to a telecommunication method for authenticating a user with respect to a computer system, the computer system comprising an authentication system including a user interface and an interface for connecting the computer system to a digital, cellular telecommunication network, the authentication being carried out by way of a mobile telecommunication terminal, the mobile telecommunication terminal comprising an interface for the communication network, the computer system comprising a memory in which a communication address for the telecommunication terminal is stored, comprises: the user identifies himself or herself with respect to the authentication system of the computer system by entering login information via the user interface; after successful identification of the user on the authentication system, the authentication system accesses the communication address stored in the memory and transmits an activation request via the communication network to the mobile telecommunication terminal; the mobile telecommunication terminal automatically ascertains at least one piece of information that is required for activating the computer system for the user by way of a program that is stored on the mobile telecommunication terminal and/or by way of an interface of the mobile telecommunication terminal; the mobile telecommunication terminal automatically checks whether the ascertained information meets at least one predefined criterion that is stored on the mobile telecommunication terminal; the mobile telecommunication terminal transmits activation information for the user on the computer system via the communication network to the authentication system if the ascertained information meets the stored criterion; upon receipt of the activation information, the authentication system issues an authentication signal indicating the authentication of the user to the com- (Continued)

puter system. The disclosure further relates to a system for carrying out such a method.

16 Claims, 4 Drawing Sheets

(56) References Cited

U.S. PATENT DOCUMENTS

| | | | | |
|---|---|---|---|---|
| 9,032,498 | B1* | 5/2015 | Ben Ayed | G06F 21/35 |
| | | | | 726/9 |
| 9,264,899 | B2* | 2/2016 | Rombouts | H04L 9/3271 |
| 9,521,032 | B1* | 12/2016 | Worsley | H04L 41/00 |
| 2004/0097217 | A1* | 5/2004 | McClain | H04L 63/083 |
| | | | | 455/411 |
| 2005/0066179 | A1* | 3/2005 | Seidlein | G06Q 20/32 |
| | | | | 713/182 |
| 2009/0292959 | A1* | 11/2009 | Melamed | G06F 11/0709 |
| | | | | 714/57 |
| 2010/0004972 | A1* | 1/2010 | Harel | G06Q 10/06 |
| | | | | 705/7.25 |
| 2010/0088749 | A1 | 4/2010 | Steeples | |
| 2013/0167196 | A1* | 6/2013 | Spencer | H04W 8/22 |
| | | | | 726/3 |
| 2013/0312087 | A1* | 11/2013 | Latzina | G06F 21/00 |
| | | | | 726/19 |
| 2014/0157359 | A1 | 6/2014 | Ingrassia, Jr. et al. | |
| 2014/0157381 | A1 | 6/2014 | Disraeli | |
| 2014/0188938 | A1* | 7/2014 | Banks | G06F 21/6227 |
| | | | | 707/783 |
| 2014/0324610 | A1* | 10/2014 | Ans | G06Q 20/1085 |
| | | | | 705/21 |

* cited by examiner

TELECOMMUNICATION METHOD FOR AUTHENTICATING A USER

The invention relates to a telecommunication method for authenticating a user with respect to a computer system. The invention further relates to a system for carrying out such a method.

It is known to use mobile telecommunications terminals, such as mobile phones or smart phones, for authenticating a user on a computer system. After the user on the computer system has been identified, for example by way of a user name and password, a link is established to the mobile telecommunication terminal via a telecommunication network. The user is authenticated via an additional exchange of information between the authentication system of the computer system and the telecommunication terminal. Since the user usually carries the telecommunication terminal with himself or herself, authentication is only possible personally by the user, whereby an additional security check is carried out.

In simple cases, this exchange of information may be a code, for example, such as a TAN, which the authentication system transmits to the telecommunication terminal and which the user enters for authentication on the computer system. Alternatively, the authentication system of the computer system can request a password, which the user enters on the telecommunication device and which is transmitted by the telecommunication device to the authentication system. Methods of this type, however, require additional interaction by the user or additionally require the operation of the telecommunication terminal.

To facilitate the authentication process, defined criteria can be stored in the authentication system of the computer system. The authentication system requests appropriate information from the mobile telecommunication terminal, which is ascertained, for example, via a program that is installed on the telecommunication terminal. The authentication system then compares this information to the defined criteria, wherein authentication takes place only if there is agreement with the criteria. The request for information and the ascertainment and transmission of the same to the computer system can take place in an automated fashion, for example by a program that is installed on the telecommunication terminal, so that no further interaction by the user is necessary. The criteria are selected in such a way, for example, that unique identification of the user is possible without additional interaction by the user. For example, the criterion can contain the position data of the computer system. The telecommunication terminal requests the position data of the computer system. An authentication takes place only if the position data of the user agrees with the position data of the computer system, which is to say when the user is at the location of the computer system. Such a method is shown in US 2014/0157381 A1, for example.

The disadvantage of this method is that personal data of the user must be transmitted to the authentication system. This opens up possibilities for manipulation. Moreover, the user has only limited control over the further use of this data. It would be possible, for example, that transmitted position data of the user is stored, and thereby a movement profile of the user could be created.

Furthermore, access to the computer system provides the possibility for the criteria to be changed. This has the disadvantage that a person gaining access to the computer system in an unauthorized manner could also manipulate the criteria or the communication address of the telecommunication terminal.

It is the object of the invention to provide a method and a system for authenticating a user on a computer system, which have improved user friendliness and improved security at the same time. It is a further object of the invention that the user retains data sovereignty over the data ascertained by the mobile telecommunication terminal during the authentication on the computer system.

The objects of the invention are achieved by the characteristics of the independent claims. Embodiments of the invention are described in the dependent claims.

Embodiments of the invention are particularly advantageous since the criteria are not stored centrally, but on the mobile telecommunication terminal, and the information is also ascertained and checked entirely by the mobile telecommunication terminal. Consequently, no personal information is passed on to the computer system, only activation information; however, this information does not contain any personal data of the user, except for an identifier that identifies the user. Consequently, no personal data is passed on to the computer system. The user retains full data sovereignty over his or her personal data, so that an undesirable storage of personal data can be prevented, for example.

The method according to the invention moreover offers increased security. A person seeking to gain access to the computer system in an unauthorized manner must not only possess the login information, but also be in possession of the mobile telecommunication terminal since the criteria for activating the computer system are stored only on this terminal, and moreover satisfy the criteria stored on the telecommunication device for the respective computer system. It is therefore reliably precluded that the criteria can be changed, for example by more comprehensive data access to the computer system.

Despite the increased security, the user nonetheless attains increased flexibility since, for example, the user can personally change the criteria on the mobile telecommunication terminal. This has the advantage that a rapid adaptation of the criteria is possible. It is possible, for example, that the criteria can be quickly adapted to the position of the travel destination in the event of a trip on short notice, if the criteria contain position data.

A "telecommunication terminal" shall be understood here to mean a portable, battery-operated device comprising an interface for a communication network, in particular a mobile telephone, a smart phone or a portable computer, such as a laptop, notebook or tablet PC comprising an interface for the communication network. The interface for the communication network can be a mobile communication interface or an interface for other corded or wireless communication, such as a Bluetooth and/or WLAN interface.

"Interfaces" shall be understood here to mean any devices on the computer system or on the telecommunication terminal via which a link can be established to a communication network. The interfaces can be designed for wireless communication with a communication network, for example. However, it is also possible that the interfaces are designed for connecting the computer system or the telecommunication terminal to a corded communication network.

A "digital, cellular communication network" shall be understood here to mean any kind of telecommunication network which the telecommunication terminal can log onto using an interface. This term in particular includes telecommunication networks that operate according to a mobile communication standard, such as a GSM, UMTS, CDMA or LTE standard. Furthermore, communication networks such as corded Internet networks, wireless LAN networks or links via Bluetooth or another interface of the telecommunication terminal are possible. Such a communication network can be used, for example, to establish a link to the Internet. Alternatively, the link can be established directly via a WLAN network, a Bluetooth connection, or another close range connection.

A "computer system" shall be understood here to mean a data processing device or a system composed of multiple data processing devices. The computer system can be composed of multiple workstations, for example, which are connected to a central server, wherein the authentication system can be installed on the workstation processors or on the server. For example, the computer system is composed of a central server comprising multiple client processors. The computer system, however, can also be an individual processor, which has an Internet interface, for example. It is only necessary that the computer system has an input option, via which the user is able to identify himself or herself on the computer system, and an authentication system and an interface for establishing a link to the communication network.

According to one embodiment of the invention, the criterion is formed by predefined position and/or movement data. The information is formed by position and/or movement data that the telecommunication terminal receives via an interface or ascertains by way of sensors and/or ascertains based on the data that the telecommunication terminal receives via an interface or ascertains by way of sensors.

The position data is, for example, the coordinates of the computer system or of a workstation from which access to the computer system is to be allowed. The user is thus only authenticated when he or she, together with his or her mobile device, is located at this position, which is to say the position data ascertained by the communication terminal agrees with the position data stored as the criterion.

The position data can be GPS coordinates, for example, which are ascertained by way of an internal or external GPS module. Alternatively, the position data may also be an address that is entered by the user. It is also possible to use other information for determining the position. It is known from the prior art, for example, to use data from communication networks for location determination or for improving the accuracy of the determination of the location.

The data of the communication network that is used to determine the location or to improve the accuracy of the location can be information about wireless LAN networks or radio cell information of a mobile communication network, for example.

Alternatively, it would also be possible to use the data of a building access system. For example, the location of the user can be determined by requiring the user to register upon entering a building or to log out upon leaving the building. Between these two processes, the location of the user is stored in the building access system as "in the building." Via an interface, for example, the mobile telecommunication terminal can establish a link to the building access system and request this information.

To improve the accuracy of the position data or else to enable a position determination in the absence of receipt of localization data, it is also possible, for example, to take the data of a movement or acceleration sensor into consideration when ascertaining the position. In the absence of GPS reception, for example, what is known as inertial navigation is possible, in which it is possible, proceeding from a last known location, to estimate the position of the telecommunication terminal via the measured accelerations.

Independently of the described exemplary embodiments, a variety of options and combinations of such options are possible so as to carry out a position determination using a mobile telecommunication terminal.

The position determination can be carried out entirely by sensors or means of the telecommunication terminal. The telecommunication terminal can also use external sensors or means, which are connected to the telecommunication terminal via interfaces. As an alternative or in addition to position data, the criteria can also contain movement data, in particular acceleration data, for example.

The movement and acceleration data does not have to be used for ascertaining the position, but can also form a separate criterion.

In the case of a stationary computer system, for example, it can be assumed that the user, when identifying himself or herself on this computer system, is at rest, which is to say in front of the computer system. An upper speed limit, for example, or a non-existent speed could be used as the criterion. The telecommunication terminal can ascertain the present speed for authentication purposes. If this speed exceeds a defined value stored in the telecommunication terminal as a criterion, no activation information is issued since the user, if he or she is moving at a defined speed, cannot be permanently present at the stationary computer system.

Likewise, the acceleration sensor can be used to check whether the user is at rest or moving, such as walking. Such movements can be detected very easily by way of movement sensors present in modern telecommunication terminals. In particular, the data of what are known as fitness wristbands can be used for this purpose, which are coupled, for example, to the mobile telecommunication terminal.

The position, movement and acceleration data can also be processed by the telecommunication terminal to yield a movement profile, a speed profile or an acceleration profile, whereby further options for criteria to be checked are possible.

It is possible, for example, to check where the user was located during the last log-in attempt. If it is technologically not possible for the user, in the time that has since passed, to have reached a position that makes him or her eligible to log onto the computer system, no activation is issued.

Likewise, it is possible to ascertain based on the acceleration and/or speed profile whether the user is only briefly at rest, but essentially moving.

So as to cover measuring inaccuracies, the criteria can each contain corresponding inaccuracy factors. It is possible, for example, to provide coordinates having a defined perimeter, so that the user does not have to be present precisely at the position, but within a perimeter of 50 meters, for example, around the provided coordinates.

As an alternative or in addition, the criteria can also contain time or date information. For example, an authentication can take place at a workplace only at certain times. A computer system that is provided at an office workstation, for example, could be blocked outside of working hours or during vacation time, so that it is not possible to log on via these computer systems during these times. On the part of an employer, this could additionally provide the option of limiting the working time of the user, for example by allowing an authentication at the office workstation to take place only during regular working hours.

The time information can also be time periods, for example, such as project time periods, for the duration of which a particular computer system is activated. It is customary for such time-based activations to be set up by an administrator, which has the disadvantage that, if the project is completed early, authentication on this computer system remains possible until the administrator deactivates the same. On the other hand, a project may take longer than anticipated, wherein authentication is not possible until the administrator has adapted the project term. The described method allows the user in such instances to quickly adapt the criteria, so that swift blockage or activation of individual computer systems is possible.

For example, the user could delete the identifier of the particular computer system from the memory of the telecommunication terminal even after a project has been completed, so that no activation information can be transmitted for this computer system. The user, however, can also easily add further computer systems.

So as to enable the authentication of the user on different computer systems, for example having different locations, different criteria and identifiers can be stored for different computer systems on the mobile telecommunication terminal. Together with each activation request, the authentication system of a computer system transmits an identifier of the particular computer system to the mobile telecommunication terminal. The mobile telecommunication terminal ascertains the information as a function of the identifier of the computer system and checks whether the ascertained information agrees with the criteria stored for the particular computer system.

In this way, different positions can be stored as the criterion for different computer systems. For a home workstation processor, the position data may be the home address of the user, for example, so that logging on in via the home workstation is only possible when the user is in fact located there. In contrast, the coordinates for the office processor correspond to the address of the workplace, for example. If a mobile computer system is involved, it is also possible to provide a movement profile or a defined territory in which the user must be located, together with his or her telecommunication terminal.

If one of the computer systems is a mobile computer system, it is also possible, for example, to activate movement profiles in which the user is on the move, so that working on a train or another means of transportation is also possible, for example.

The above-mentioned criteria can thus be used to form multifaceted combinations so as to form at least one criterion for different computer systems via which an authentication is carried out. For example, it is also possible that different types of criteria are stored for different computer systems, such as position information for one computer system and time or date information for another computer system.

Instead of a positive criterion, a negative criterion could also be formulated. Instead of an activated time, blocked times could also be provided, for example, or certain positions could be excluded from the authentication in the case of a mobile computer system.

One advantage of the method is that the criteria are stored on the mobile telecommunication terminal, and not on a computer system. In particular when multiple computer systems are used, this makes managing the criteria for the different computer systems easier for the user since these are managed on the telecommunication terminal.

The mobile telecommunication terminal preferably comprises an interface, via which the criteria can be entered into the mobile telecommunication terminal. This interface can establish a temporary link to another input device, for example, via which it is easy to input or override the respective criteria. Alternatively, the interface is a keyboard or an input screen of the telecommunication terminal via which the criteria can be entered.

It is also possible to use multiple interfaces. A first interface, for example, can be used to select the type of the criterion, such as position data. The second interface establishes a link to a GPS module so that the present position of the telecommunication terminal, for example, can be stored as a criterion.

The criteria can be entered and managed personally by the user, which has the advantage that the user is able to flexibly adapt the criteria to his or her needs. However, it is also possible for criteria to be loaded onto the telecommunication terminal by an administrator or an external service using the interface.

The criteria are preferably stored in encrypted and/or password-protected form on the mobile telecommunication terminal, whereby unauthorized individuals are prevented from reading out the criteria. This moreover prevents a user who comes into possession of the telecommunication terminal in an unauthorized manner from changing the criteria so as to be able to authenticate himself or herself on a computer system. Moreover, an unauthorized person cannot gain knowledge about the stored criteria, so that an authentication is prevented, or at least made more difficult, even when this person is in possession of the telecommunication device.

The criteria can be stored in a program, for example, which is installed on the telecommunication terminal. Alternatively, it is also possible to use a central password management feature of the respective telecommunication terminal.

As an alternative or in addition to the above-described method, it is also conceivable that the mobile telecommunication terminal checks, upon receipt of the activation request, whether the user is authorized to authenticate himself or herself on a computer system. This makes the option possible that the user changes the criteria on his or her telecommunication terminal, for example after leaving the workplace, to the effect that authentication inquiries for this computer system are generally rejected. It is thus possible, for example, for a check as to whether the user is authorized to conduct the authentication to be carried out prior to ascertaining the information.

The communication network can be a mobile communication network, an Internet network, or a local network, for example. A local network can be an Intranet, for example, in which additional control of the location is possible since the user must register in this local network. Close range networks, such as Bluetooth, are also possible, for example.

A reliable link can be established by the respective computer system to the telecommunication terminal via the communication address of the telecommunication terminal. The communication address offers a unique identification of the telecommunication terminal. The communication address is, for example, a URL, a mobile phone number, an IP address, an e-mail address, or another address common in networks that allows an unambiguous association of the telecommunication terminal. The address can be established as a function of the communication network that is used. For example, an IP address, a URL or an e-mail address is possible when the Internet is used, or a mobile phone number when a mobile communication network is used. In addition or as an alternative, the telecommunication terminal can receive an identifier, which uniquely identifies the telecommunication terminal in the respective communication network.

It is possible to integrate an additional security stage in that the authentication system transmits a notification to the user upon receipt of the activation information. This message can be sent to the communication address, which is to say to the telecommunication terminal. However, it is possible for this message to be sent to separate address, for example a mobile phone number, so that the user is notified separately. Instead of notifying the user, it is also possible to generate a message to an administrator or another person, for example so as not to disturb a user who is on vacation.

The notification can be made visually or acoustically, for example.

Depending on the selected criterion and the location of the user, it is possible that the telecommunication terminal is not able to ascertain the information required for the comparison to the criteria. It is possible, for example, that a GPS module has no reception in larger buildings, and consequently no position can be ascertained. In the event of an error in the ascertainment of the information, a transmission error of the activation information and/or when the authentication system receives no activation information following a defined waiting period after the activation request was sent, a notification is sent to the user via the authentication system and/or the telecommunication terminal, for example. This allows the user to react appropriately, for example to change the location in such a way that position data can be received or a better link to the computer system can be established.

The computer system can establish a direct link to the telecommunication terminal, for example, when these are located in the same communication network. Alternatively, the communication address stored in the memory of the authentication system can be the address of a server or of a service that receives the activation request, wherein the server or the service comprises a memory in which the communication address of the telecommunication terminal is stored. The server or the service accesses the communication address of the telecommunication terminal after receipt of the activation request of the computer system and forwards the activation information to the telecommunication terminal. The activation information is then passed on via the server or the service to the authentication system of the computer system.

This method has the advantage that different communication networks can be used for the computer system to communicate with the server or the service, and for the server or the service to communicate with the telecommunication terminal. The computer system thus does not require any additional interfaces to be able to connect directly to the telecommunication terminal. However, the ascertainment of the information and the comparison to the criteria are carried out exclusively by the mobile telecommunication terminal in this method as well. The server does not store criteria, nor is the comparison of the information to the criteria carried out on the server. Like the computer system, the server or the service receives only activation information, which is forwarded to the authentication system, and thus no personal data of the user. Moreover, it is not necessary to store the communication address of the user on every computer system. This address is stored only on the server, whereby the data security of the user-related data is additionally increased.

The computer system, the server, and the mobile telecommunication terminal can also use a shared communication network.

If a direct link is established between the computer system and the telecommunication terminal, the mobile telecommunication terminal is preferably registered with the authentication system of the computer system, wherein the authentication system receives the communication address, and an identifier is issued for the authentication system, which allows the authentication system to be uniquely identified with respect to the mobile telecommunication terminal. This additionally prevents abuse of the method in the event of the communication address is changed since the identifier of the authentication system is required, in addition to the communication address.

If an additional service or a server is used, the authentication system is registered with this server or service, for example, wherein the server issues an identifier to the authentication system and transmits a communication address for the activation request to the authentication system. The mobile telecommunication terminal is likewise registered with the server, wherein the mobile telecommunication terminal transmits a communication address of the mobile telecommunication terminal to the server for forwarding an activation request received from the authentication system to the mobile telecommunication terminal, and the server transmits the identifier of the registered authentication system to the mobile telecommunication terminal. This method could facilitate the registration of the computer systems, since it is not necessary to register each computer system individually with the mobile telecommunication terminal. The identifiers of the computer systems can be transmitted from the server to the telecommunication terminal, for example. Thereafter, the criteria can be selected and issued on the telecommunication terminal.

Preferably, a utility with which the user registers using user data is installed on the server, wherein this user data is used for the communication between the server and the computer program and/or between the server and the telecommunication terminal and for the identification of the user.

A program for ascertaining the information and for comparing the information to the stored criteria and/or checking the authorization of the user can be installed on the mobile telecommunication terminal, wherein the program is stored on a server and not activated for installation until the user has registered with a utility stored on the server. As a result of the preceding registration of the user, it can be ensured, for example, that a communication address is assigned to the telecommunication terminal and that a registration of the telecommunication terminal takes place. Moreover, it is thus ensured that no unauthorized persons can load the program from the server and use the same to register with the server or a service.

A system for carrying out this method preferably comprises a computer system, wherein the computer system comprises an authentication system including a user interface and an interface for connecting the computer system to a communication network. Moreover, such a system comprises a mobile telecommunication terminal, wherein the mobile telecommunication terminal comprises an interface for the communication network and at least one program and/or an interface for ascertaining the information required for the activation information.

The mobile telecommunication terminal preferably comprises at least one interface, at least one sensor and/or at least one program for ascertaining the information and/or for ascertaining data based on which information is ascertained. The sensors can be GPS receivers, movement sensors, acceleration sensors, or other suitable sensors of conventional telecommunication terminals, for example. These sensors can be integrated into the telecommunication terminal or be connected thereto via an interface. An installed program can, for example, create a movement profile from the ascertained information, calculate the speed from the movement data, or output the present time or the present date.

Embodiments of the invention will be described in more detail hereafter with reference to the drawings. In the drawings:

Elements of the following embodiments that correspond or are similar to each other are each denoted by the same reference numerals.

Figure 1:
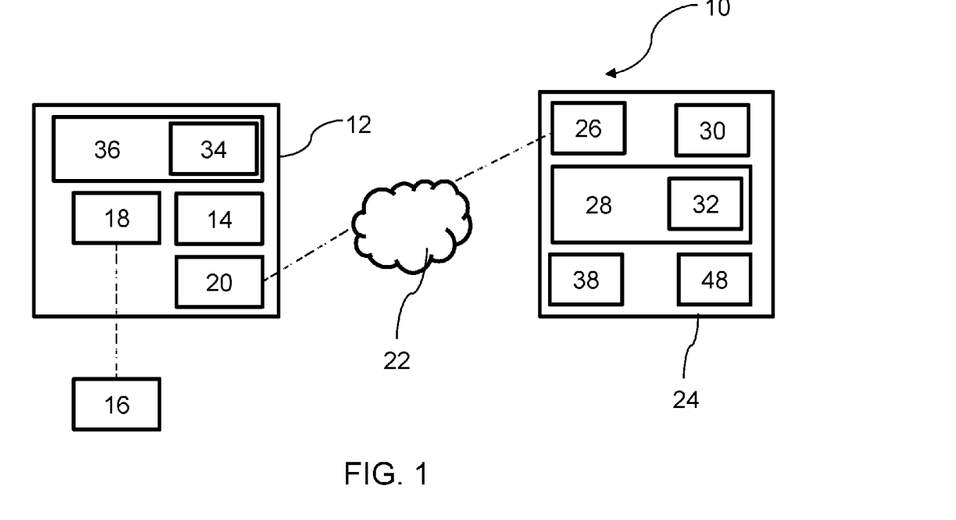
FIG. 1 shows a first embodiment of a system for authenticating a user on a computer system.
Figure 2:
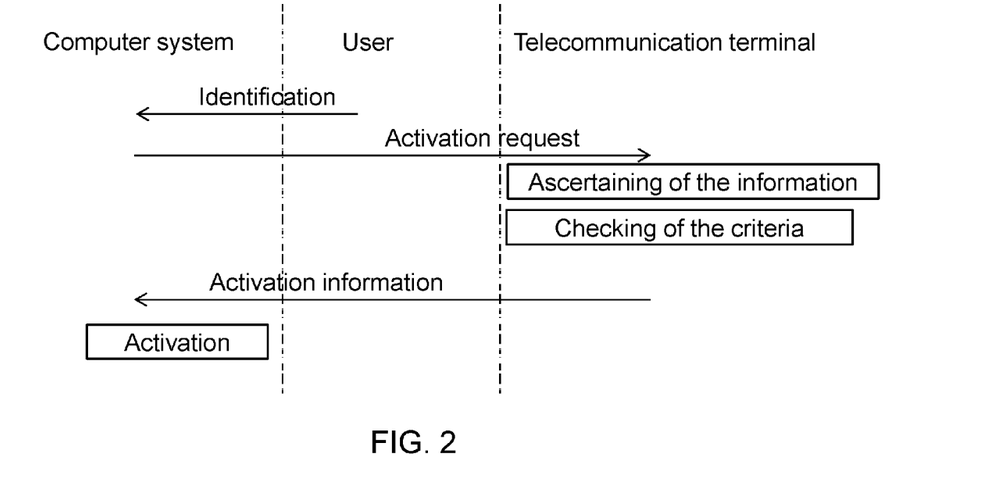
FIG. 2 shows a schematic representation of a method for authentication on the computer system from FIG.

FIG. 1 shows a system 10 for carrying out the authentication method described in FIG. 2.

The system 10 has a computer system 12, which is shown only schematically here. The computer system 12 can be a conventional stationary computer, part of a computer network, or a portable computer system, such as a laptop, a notebook or a tablet PC.

The computer system 12 has an authentication system 14 for identifying and authenticating a user 16. The computer system 12 furthermore has a user interface 18, which is connected to the authentication system 14 and via which a dialog with the user 16 can take place, for example so as to identify the user 16 on the authentication system 14.

The user interface 18 can be formed by a monitor and a keyboard, for example, via which the user 16 can enter his or her user data and a stored password, for example. Alternatively, card readers, scanners or other suitable user interfaces 18 are also possible, via which a user 16 can register with on the computer system 12 or on the authentication system 14 and identify himself or herself.

The computer system 12 furthermore has an interface 20 for connecting the computer system 12 to a communication network 22.

The communication network 22 is a digital, cellular communication network, for example, which operates according to a mobile communication standard such as a GSM, UMTS, CDMA or LTE standard. Alternatively, wireless LAN or corded communication networks or close range networks via a Bluetooth or another close range interface are possible. A link to the Internet, for example, is established via the digital, cellular communication network, or the computer system 12 and a mobile telecommunication terminal 24 communicate directly.

The computer system 12 furthermore comprises a memory 36 in which a communication address of the mobile telecommunication terminal 24 is stored.

The system 10 furthermore comprises a mobile telecommunication terminal 24. The mobile telecommunication terminal 24 is a portable, battery-operated device, in particular a mobile telephone, a smart phone or a portable computer, which the user 16 can carry with himself or herself.

The telecommunication terminal 24 comprises an interface 26 for connecting to the communication network 22. In the embodiment shown in FIG. 1, the communication network 22 is the communication network that is also used by the computer system 12 and the interface 20 thereof.

The telecommunication terminal 24 furthermore comprises a memory 28 and means 30 that can be used to ascertain information defined in greater detail hereafter. Criteria, which are described hereafter, and a program 32, which is able to compare the information ascertained by way of the means 30 to the criteria stored in the memory 28, are stored in the memory 28.

Based on FIG. 2, a telecommunication method for authenticating a user 16 on the computer system 12 from FIG. 1 is described hereafter.

It is assumed that the user 16 carries the telecommunication terminal 24 with himself or herself.

In a first method step, the user 16 identifies himself or herself with respect to the authentication system 14 of the computer system 12 by entering login information via the user interface 18. The login information can be a user name and an associated password, for example. However, the user may also identify himself or herself on the computer system 12 in another manner. It is only necessary that the user is able to identify himself or herself uniquely on the computer system 12 or on the authentication system 14.

After successful identification of the user 16 on the authentication system 14, the authentication system 14 or a program 34 set up in the memory 36 accesses the communication address of the telecommunication terminal 24 stored in the memory of the computer system 12 or of the authentication system 14. The authentication system 14 or the program 34 transmits an activation request for the user 16 via the interface 20 or the communication network 22 to the communication address of the telecommunication terminal 24.

The activation request contains information that uniquely identifies the user 16. For example, this information can be the user name of the user 16, an ID assigned to the user 16, or another code that uniquely identifies the user 16. The activation request furthermore contains information that uniquely identifies the computer system 12. For example, this information can be a name assigned to the computer system 12, an ID, or an IP address. It is only necessary that the computer system 12 and the user 16 who is to be authenticated on the computer system 12 can be uniquely identified.

Upon receipt of the activation request, the program stored in the memory 28 of the telecommunication terminal 24 accesses the criterion that is associated with the computer system and stored in the memory 28.

The program reads out the criterion and initiates the ascertainment of information that is to be compared to this criterion.

The criterion is position information or time information, for example. The criterion is the position of the computer system 12, for example.

Thereafter, the information is ascertained by the telecommunication terminal 24. The information can be the present position of the telecommunication terminal 24, for example, which is to say that of the user 16.

For this purpose, the telecommunication terminal 24 comprises a sensor 48 which ascertains the information. The sensor 48 is a GPS sensor, for example. Alternatively, the telecommunication terminal can also comprise interfaces via which the telecommunication terminal 24 can be coupled to sensors. In addition or as an alternative, means 30, for example a program, can be used, via which the required information can be ascertained, for example calculated based on other, measured or ascertained data.

Upon ascertainment of the information, the same is compared to the stored criterion by the program 32 on the telecommunication terminal 24.

If the information ascertained by the telecommunication terminal 24 agrees with the criteria stored for the computer system 12, the telecommunication terminal 24 transmits activation information for the user 16 via the communication network 22 to the authentication system 14 of the computer system 12.

Upon receipt of the activation information, the authentication system 14 issues an authentication signal indicating the authentication of the user to the computer system 12, whereby the computer system 12 or a program installed on the computer system 12 is activated for the user 16.

The method described in FIG. 2 offers the advantage that the criteria for activating the computer system 12 are not stored centrally, but on the mobile telecommunication terminal 24. Furthermore, the ascertainment of the information to be compared and the comparison of the information to the criteria are carried out entirely by the mobile telecommunication terminal.

The computer system 12 or the authentication system 14 receives only the activation information, which, apart from the user identifier and information for the computer system 12, does not contain any user-related, in particular no personal, data. As a result, no personal data, which could be stored on the computer system 12, is passed on. Moreover, it is not necessary to store personal data on the computer system 12 itself, for example position data, based on which the user 16 is allowed to log onto the computer system 12. The user 16 retains full sovereignty over his or her data.

Since the criteria, which is to say the necessary coordinates, are stored only on the telecommunication terminal 24, a user who may gain access to the computer system 12 in an unauthorized manner is not able to read these out from the memory of the computer system 12 and potentially manipulate the authentication system 14. To gain access to the computer system 12, it is necessary to be in possession of the login information for identification on the computer system. Moreover, it is also necessary to be in possession of the telecommunication terminal 24, or the criterion stored on the telecommunication terminal must be met.

The criteria can be selected from a plurality of pieces of information, which the telecommunication terminal 24 is able to ascertain. The criteria can also be a combination of different data, which the telecommunication terminal 24 is able to ascertain.

One criterion can be the position of the computer system 12, for example. It is assumed that the user 16, and hence also his or her telecommunication terminal 24, is located at the position of the computer system 12 when logging onto the computer system 12. Following the activation request, the telecommunication terminal 24 thus ascertains the present position of the telecommunication terminal 24 and compares the same to the position stored for the computer system 12 as the criterion. So as to compensate for inaccuracies in the position determination, it is possible to provide a defined variance, so that it is sufficient, for example, for the position ascertained by the telecommunication terminal 24 to be located within a defined perimeter around the position stored as the criterion.

In addition to the position data, it is also possible, for example, for the criteria to include movement data, acceleration data and/or movement and/or acceleration profiles. In the case of a stationary computer system 12, for example, the criterion that is stored can be that the position of the user 16 must not change, which is to say that the user 16 must not move, since it is assumed that the user 16 is located in front of the computer system 12, which is to say at rest, when operating this computer system 12. If the telecommunication terminal 24 were to ascertain that the user 16 is moving, for example walking or on the way on a means of transportation, the criterion would not be met, and the activation information is not transmitted.

A movement or a speed can be ascertained in a variety of ways. For example, acceleration sensors present in the mobile telecommunication terminal 24 can be used for this purpose. These are also used as what are known as fitness trackers, for example, which is to say as pedometers, so that it is possible via these to detect whether a user 16 is moving. The type of movement, for example, can also be ascertained by way of these sensors, whereby it can be unambiguously detected whether the user 16 is moving.

Optionally, the program 32 stored on the telecommunication terminal 24 can also ascertain a movement and/or acceleration profile. Such a profile can also be used to recognize whether the user 16 is generally moving or taking a short break.

The movement profile can also contain position data, for example, whereby a comparison of the log-in position of the user can take place. For example, if the user at short intervals attempts authentication on two different computer systems 12 located some distance apart from each other, a plausibility check can be carried out as to whether the user could have moved from one of the computer systems 12 to the respective other in the time that has passed.

Alternatively, the criterion can also contain date or time information, for example. In a simple embodiment, for example, a time period can be provided during which authentication on the computer system 12 is generally not possible. This time period can be a sleep period or a vacation period, for example, during which the user is not able to log into the office processor, for example. Unauthorized access to the computer system 12 is thereby precluded during the absence of the user 16.

A plurality of criteria are possible as a result of the plurality of sensors or the means for ascertaining information that are present in modern telecommunication terminals. These can contain individual data or a combination of data.

For example, the criterion can also be a combination of position, movement, speed and/or time or date information.

The telecommunication terminal 24 comprises an interface 38, via which the criteria can be entered into the mobile telecommunication terminal 24. This allows the user 16 to quickly and easily configure the telecommunication terminal 24 or the program, and thus, for example, to quickly carry out an adaptation if the locations of the computer system 12 have changed. The interface 38 can be formed by an input medium of the telecommunication terminal 24, for example, such as a keyboard, a touch screen, or an interface to a sensor. For example, the command to "store the present position as a criterion" could be issued via the interface 38, whereupon the program ascertains the present position via a GPS sensor or other means or sensors and stores the same in the memory as the criterion. Alternatively, the interface 38 can also be an interface to a communication network or a computer system via which the criteria can be entered. In this way, for example, an administrator can save predefined criteria, for example for a company network, on a telecommunication terminal 24.

The criteria on the mobile telecommunication terminal 24 are preferably encrypted and/or password-protected, so that these cannot be read out and/or modified without knowledge of the respective key or password even if the telecommunication terminal 24 should be accessed.

The criteria can be stored directly in the program 32, for example. However, it is also possible to use a central password management feature of a telecommunication terminal 24 for this purpose.

In an additional step of the method, information that the authentication process has been successfully completed is sent from the authentication system 14 or from the computer system 12 to the user 16. This offers the user 16 an additional security check that prevents unauthorized authentication on the computer system 12. The user can be notified on the telecommunication terminal 24, for example, wherein either the communication network 22 or a separate communication network can be used. For example, it is possible for this notification not to be transmitted via the Internet, but in the form of an SMS via a mobile communication network.

The user 16 can be notified visually, for example, via a display on the telecommunication terminal, acoustically or in another manner. Depending on the selected system 10, a third person, such as an administrator, may be notified, if it is known that the user 16 is not to be disturbed, for example because he or she is on vacation.

Likewise, it is possible that an error message is sent to the user 16 if errors occur in the described method. Such an error in the method can be a transmission error of the activation information, for example. It is also possible that the authentication system 14 is not able to establish a link to the telecommunication terminal 24. In this case, for example, an error message is sent after a defined waiting period.

It is also possible, for example, that the telecommunication terminal 24 is not able to ascertain any position data due to the position of the terminal, for example in a shielded building. An error message indicating the error can be sent to the user 16 in this case as well. The user 16 thus has the option of reacting to this error, for example to change his or her location such that a position determination is possible.

Figure 3:
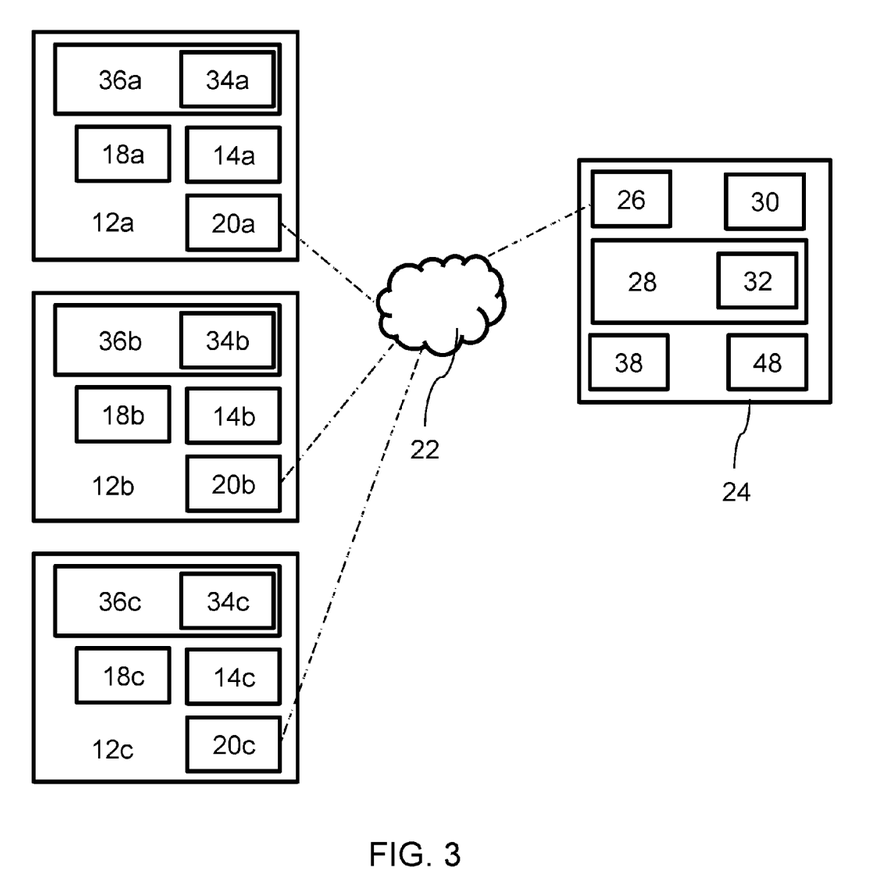
FIG. 3 shows a second embodiment of a system for authenticating a user on a computer system.

FIG. 3 shows a further embodiment of a system 10. This system 10 comprises multiple computer systems 12a, 12b, 12c, the composition of which in each case corresponds to the computer system 12 shown in FIG. 1. Analogous to FIG. 1, the system 10 furthermore comprises a telecommunication terminal 24.

So as to authenticate a user 16 identifying himself or herself on the respective computer system 12a, 12b, 12c, each of the computer systems 12 can establish a link to the communication network 22 and to the telecommunication network 24 via an interface 20a, 20b, 20c.

Each of the computer systems 12a, 12b, 12c is assigned a unique identifier, which is transmitted together with an identifier of the user 16 to the telecommunication terminal 24 when the activation request is transmitted. Transmitting the identifier and a user identifier allows an unambiguous association as to the computer system 12a, 12b, 12c from which the activation request is coming and the user 16 who is to be authenticated.

Separate criteria are stored in the telecommunication terminal 24 for each computer system 12a, 12b, 12c, wherein the criteria of the different computer systems 12a, 12b, 12c may differ. The ascertainment of the information and the comparison to the criteria by the telecommunication terminal 24 are carried out as described in FIG. 2, wherein the information is ascertained specifically for the criterion of the respective computer system 12a, 12b, 12c and compared to the criterion stored for the respective computer system 12a, 12b, 12c.

The criteria for the computer systems 12a, 12b, 12c can each contain the location coordinates of the respective computer system 12a, 12b, 12c, for example, so that the user 16 can only be authenticated if the same is present at the location of the respective computer system 12a, 12b, 12c.

Depending on the type of the computer system 12a, 12b, 12c, the position data can, for example, be defined differently. For example, one of the computer systems 12a, 12b, 12c can be a mobile computer system, so that a larger movement radius around the provided coordinates, or a larger territory within which the user may be located, may be provided for this system.

It is also possible for different types of criteria to be defined for the different computer systems 12a, 12b, 12c. In this way, for example, different times at which logging in is possible may also be defined for the different computer systems 12a, 12b, 12c.

Figure 4:
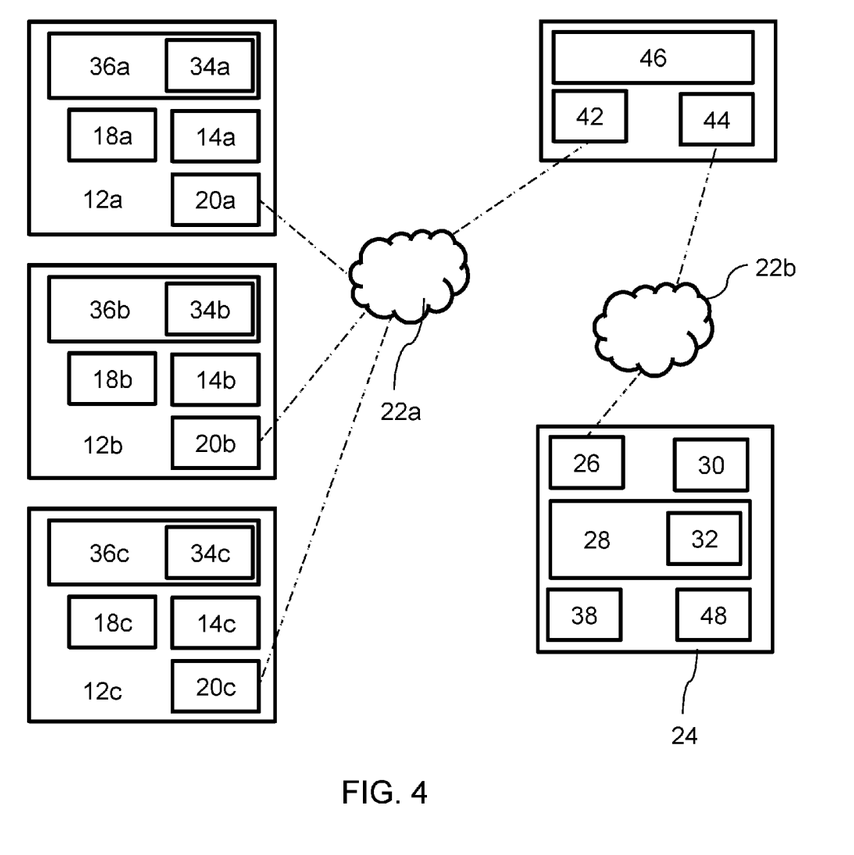
FIG. 4 shows a third embodiment of a system for authenticating a user on a computer system.

Another embodiment of a system 10 is shown in FIG. 4. The system essentially corresponds to the system shown in FIG. 3. A server 40 is additionally provided, wherein the computer systems 12a, 12b, 12c establish a link to an interface 42 of the server 40 via a first communication network 22a. In this exemplary embodiment, it is not the communication address of the telecommunication terminal 24, but the communication address of the server 40 that is stored in the memories 36a, 36b, 36c of the computer systems 12a, 12b, 12c.

The server 40 can establish a link to the telecommunication terminal 24 via a second interface 44 using a second communication network 22b. The communication address of the telecommunication terminal 24 is stored on the server 40.

This system allows the interfaces 14a, 14b, 14c of the computer systems 12a, 12b, 12c to access a different communication network 12a than the interface 26 of the telecommunication terminal 24. The server 40 thus has the function of an exchange between the communication networks 22a, 22b. The network 22a can be a wireless LAN or a LAN network, for example, and the communication network 22b can be a mobile communication network.

Figure 5:
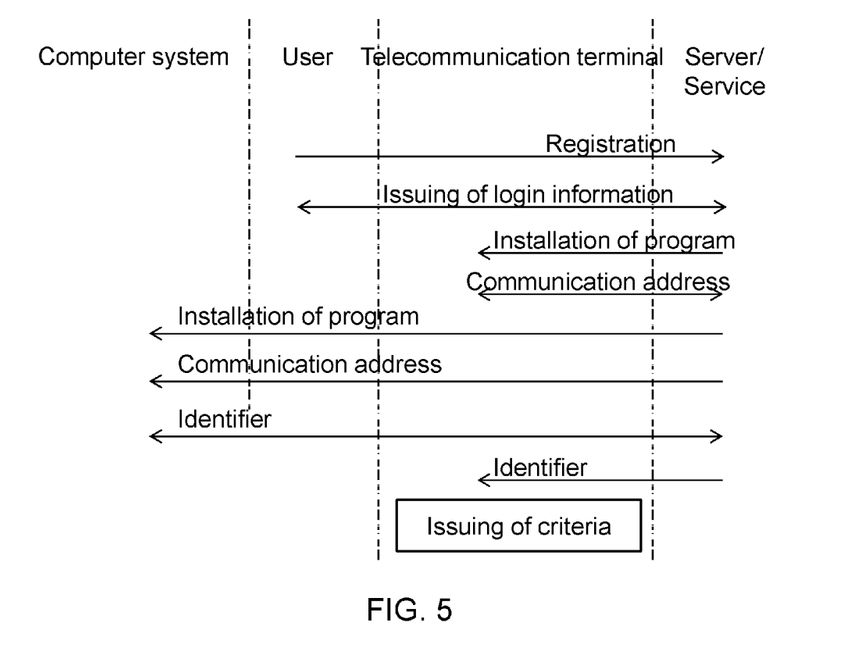
FIG. 5 shows a schematic representation of a method for initializing the system from FIG. 4.

FIG. 5 hereafter shows the initialization of the system 10 from FIG. 4.

A utility 46 for managing the user data of various users 16 is stored on a server 40. The user 16 initially registers with this server 40 or this utility 46, wherein the user 16 is assigned login information, for example a user name and a password. This login information allows the user 16 to be identified.

Thereafter, a program 32 for ascertaining the information and for comparing the information to the stored criteria is installed on the mobile telecommunication terminal 24. This program 32 can be downloaded from the server 40, for example, after the user 16 has registered with the server 40 or with the utility 46 and has been authenticated with respect to the same.

As the program 32 is being downloaded, a communication address of the telecommunication terminal 24 is being issued to the utility 46. This ensures that a link can be established from the server 40 or from the utility to the telecommunication terminal 24.

Analogously, a program 34 is loaded from the server 40 onto the authentication program of the computer system 12, this program 34 containing the communication address of the server 40. An identifier is assigned to the computer system 12, which can uniquely identify this computer system 12 with respect to the server 40 and/or the mobile telecommunication terminal 24.

Thereafter, the computer systems 12, 12a, 12b, 12c are registered with the telecommunication terminal 24, wherein the identifiers of the computer systems 12, 12a, 12b, 12c are stored in the memory of the telecommunication terminal. The registration can take place by passing on the identifiers from the server 40 to the telecommunication terminal 24. However, it is also possible for the computer systems 12, 12a, 12b, 12c to receive the communication address of the telecommunication terminal 24 and register directly with the telecommunication terminal 24. It is only necessary for the telecommunication terminal 24 to receive the identifiers of the computer systems 12, 12a, 12b, 12c.

Finally, at least one criterion, which must be met for the user 16 on this computer system 12, 12a, 12b, 12c to be authenticated, is entered for each of the computer systems 12, 12a, 12b, 12c.

It is also possible for communication addresses for different users 16 to be stored on each computer system 12, 12a, 12b, 12c or on the server 40. After the user 16 has registered, the communication address stored for the user 16 is read out, and the activation request is transmitted to this communication address. This allows the computer system 12, 12a, 12b, 12c to be used for different users. The authentication takes place in each case by a mobile telecommunication terminal 24.

Independently of the embodiment described here, arbitrary modifications of the telecommunication method and of the system using this method are possible. It is only essential to the invention that the ascertainment of the information and the comparison to the stored criteria are carried out entirely by the telecommunication terminal 24. No user-related data, except for the user identifier, is transmitted via the communication network.

LIST OF REFERENCE NUMERALS 10 system
12 computer system
12a computer system
12b computer system
12c computer system
14 authentication system
16 user
18 user interface
20 interface
20a interface
20b interface
20c interface
20 communication network
22a communication network
22b communication network
24 mobile telecommunication terminal
26 interface
28 memory
30 means
32 program
36 memory
38 interface
40 servers
42 interface
44 interface
46 utility

The invention claimed is:

1. A telecommunication method, for authenticating a user to use a computer system, the computer system comprising an authentication system including a user interface and an interface for connecting the computer system to a digital, cellular telecommunication network, the authentication of the user being carried out by way of a mobile telecommunication terminal, the mobile telecommunication terminal comprising an interface for the communication network, the computer system comprising a memory in which a communication address for the telecommunication terminal is stored, comprising:

the user identifies himself or herself with respect to the authentication system of the computer system by entering login information via the user interface;
after successful identification of the user on the authentication system, the authentication system accesses the communication address stored in the memory and transmits an activation request via the communication network to the mobile telecommunication terminal;
the mobile telecommunication terminal automatically ascertains at least one piece of information that is required for activating the computer system for the user by way of a program that is stored on the mobile telecommunication terminal and/or by way of an interface of the mobile telecommunication terminal;
the mobile telecommunication terminal automatically checks whether the ascertained information meets at least one predefined criterion that is stored on the mobile telecommunication terminal;
the mobile telecommunication terminal transmits activation information for the user on the computer system via the communication network to the authentication system if the ascertained information meets the stored criterion;
upon receipt of the activation information, the authentication system issues an authentication signal indicating the authentication of the user to the computer system, such that the computer system is activated for use by the user,
wherein different criteria and identifiers for different computer systems are stored on the mobile telecommunication terminal, the authentication system of a computer system transmits an identifier of the respective computer system to the mobile telecommunication terminal, and the mobile telecommunication terminal ascertains the information as a function of the identifier of the computer system and checks whether the ascertained information agrees with the criteria stored for the respective computer system.

2. The method for authenticating a user to use a computer system according to claim 1, wherein the criterion is formed by predefined position and/or movement data and the information is formed by position and/or movement data that the telecommunication terminal receives via an interface or ascertains by way of sensors and/or ascertains based on data that the telecommunication terminal receives via an interface or ascertains by way of sensors, it being possible for the position data to contain GPS coordinates, an address, WLAN or network information, radio cell information, data of a building access system and/or information of other positioning systems, and it being possible for the movement data to contain a present speed, an acceleration, a speed profile, an acceleration profile and/or a movement profile.

3. The method for authenticating a user to use a computer system according to claim 1, wherein the criterion includes predefined time information, and the information contains time information, ascertained by the telecommunication terminal.

4. The method for authenticating a user to use a computer system according to claim 1, wherein the mobile telecommunication device comprises an interface via which the criteria are entered into the mobile telecommunication terminal.

5. The method for authenticating a user to use a computer system according to claim 1, wherein the criteria are stored on the mobile telecommunication terminal in encrypted/password-protected form.

6. The method for authenticating a user to use a computer system according to claim 1, wherein the mobile telecommunication terminal checks, upon receipt of the activation request and prior to ascertaining the at least one piece of information, whether the user is authorized to be authenticated on a computer system.

7. The method for authenticating a user to use a computer system according to claim 1, wherein the communication network is a mobile communication network, Internet or a local network.

8. The method for authenticating a user to use a computer system according to claim 1, wherein communication address is a URL, a mobile phone number, an IP address, an e-mail address, or another address common in networks that allows an unambiguous association of the telecommunication terminal.

9. The method for authenticating a user to use a computer system according to claim 1, wherein the authentication system transmits a notification to the user, in particular to the telecommunication terminal, upon receipt of the activation information.

10. The method for authenticating a user to use a computer system according to claim 1, wherein in the event of an error in the ascertainment of the information, a transmission error of the activation information and/or when the authentication system receives no activation information following a defined waiting period after the activation request was sent, a notification is sent to the user via the authentication system and/or the telecommunication terminal.

11. The method for authenticating a user to use a computer system according to claim 1, wherein the communication address stored in the memory of the computer system is the address of a server that receives the activation request, the server comprising a memory in which the communication address of the telecommunication terminal is stored, the server accessing the communication address of the telecommunication terminal, upon receipt of the activation request from the computer system, and forwarding the activation request to the telecommunication terminal.

12. The method for authenticating a user to use a computer system according to claim 1, wherein the mobile telecommunication terminal is registered with the authentication system, the authentication system receiving the communication address and an identifier being issued for the authentication system that is able to uniquely identify the authentication system with respect to the mobile telecommunication terminal.

13. The method for authenticating a user to use a computer system according to claim 11, wherein the authentication system is registered with a server, the server issuing an identifier to the authentication system and transmitting a communication address for the activation request to the authentication system and the mobile telecommunication terminal registering with the server, the mobile telecommunication terminal transmitting to the server a second communication address for forwarding the activation request received from the authentication system of the computer system to the mobile telecommunication terminal, the server transmitting the identifier of the registered authentication system to the mobile telecommunication terminal in response to the activation request.

14. The method for authenticating a user to use a computer system according to claim 1, wherein a utility on which the user registers using user data is installed on the server, this user data being used to identify the user during communication between the server and the computer system and/or the mobile communication terminal.

15. The method for authenticating a user to use a computer system according to claim 1, wherein a program for ascertaining the information and for comparing the information to the stored criteria and/or for checking the authorization of the user is installed on the mobile communication terminal, the program being stored on a server and not activated for installation until the user has registered with a utility stored on the server.

16. A system, comprising:
a computer system, the computer system including,
at least one first non-transitory computer-readable medium storing instructions,
at least one first processor configured to execute the instructions in order to perform authentication,
a user interface for connecting the computer system to a communication network; and
a mobile telecommunication terminal the mobile telecommunication terminal including,
at least one second non-transitory computer-readable medium storing at least one program,
at least one second processor configured to execute the program in order to ascertain information necessary for transmitting activation information,
an interface for the communication network,
the system being configured to perform a method of authenticating a user to use the computer system, the method including,
the user identifies themself with respect by entering login information via the user interface of the computer system,
after successful identification of the user on the authentication system by the first processor, the first processor accesses a communication address stored in the first non-transitory computer-readable medium and transmits an activation request via the communication network to the mobile telecommunication terminal,
the second processor of the mobile telecommunication terminal automatically ascertains the information by executing the program,
the second processor automatically checks whether the ascertained information meets at least one predefined criterion that is stored in the second non-transitory computer readable medium,
the second processor transmits the activation information via the communication network to the first processor if the ascertained information meets the stored criterion, and
upon receipt of the activation information, the first processor issues an authentication signal indicating the authentication of the user to the computer system, such that the computer system is activated for use by the user,
wherein different criteria and identifiers for different computer systems are stored on the mobile telecommunication terminal, the authentication system of a computer system transmits an identifier of a respective computer system to the mobile telecommunication terminal, and the mobile telecommunication terminal ascertains the information as a function of the identifier of the respective computer system and checks whether the ascertained information agrees with the criteria stored for the respective computer system.

* * * * *